United States Patent
Jung et al.

(10) Patent No.: US 9,478,981 B2
(45) Date of Patent: Oct. 25, 2016

(54) BATTERY SYSTEM HAVING IDENTIFIERS AND ENERGY STORAGE SYSTEM INCLUDING THE SAME

(71) Applicant: SAMSUNG SDI CO., LTD., Yongin-si. Gyeonggi-do (KR)

(72) Inventors: Yeon-Sung Jung, Yongin-si (KR); Ji-Heon Kim, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 517 days.

(21) Appl. No.: 13/771,389

(22) Filed: Feb. 20, 2013

(65) Prior Publication Data

US 2014/0084689 A1    Mar. 27, 2014

Related U.S. Application Data

(60) Provisional application No. 61/705,787, filed on Sep. 26, 2012.

(51) Int. Cl.
| | |
|---|---|
| H02J 1/00 | (2006.01) |
| H02J 3/32 | (2006.01) |
| H02J 3/38 | (2006.01) |
| H02J 7/34 | (2006.01) |
| H02J 7/35 | (2006.01) |

(52) U.S. Cl.
CPC .. *H02J 1/00* (2013.01); *H02J 3/32* (2013.01); *H02J 3/382* (2013.01); *H02J 7/34* (2013.01); *H02J 3/383* (2013.01); *H02J 3/386* (2013.01); *H02J 7/35* (2013.01); *Y02E 10/563* (2013.01); *Y02E 10/566* (2013.01); *Y02E 10/763* (2013.01); *Y02E 10/766* (2013.01); *Y02E 70/30* (2013.01); *Y10T 307/50* (2015.04)

(58) Field of Classification Search
CPC ............ H02J 7/34; H02J 7/0009; H02J 3/32; H02J 9/061; H02J 1/00; Y10T 307/625; Y10T 307/74; Y10T 307/747; Y10T 307/753; Y02E 10/766; H04B 5/00; H01M 2/00
USPC .......................................................... 307/150
See application file for complete search history.

(56) References Cited

U.S. PATENT DOCUMENTS

| | | | | |
|---|---|---|---|---|
| 3,786,343 | A * | 1/1974 | Ehlers ................... | G01R 31/362 320/DIG. 18 |
| 5,654,623 | A * | 8/1997 | Shiga et al. ................... | 320/106 |
| 7,483,673 | B2 * | 1/2009 | Lee ...................... | H04B 1/3883 455/352 |
| 2006/0089177 | A1 * | 4/2006 | Lee et al. ....................... | 455/572 |
| 2006/0203411 | A1 * | 9/2006 | Fourie ..................... | C23F 13/04 361/115 |
| 2008/0122518 | A1 * | 5/2008 | Besser et al. ................. | 327/518 |

(Continued)

FOREIGN PATENT DOCUMENTS

| | | |
|---|---|---|
| KR | 10-2003-0006559 A | 1/2003 |
| KR | 20-0342786 | 2/2004 |

(Continued)

*Primary Examiner* — Jared Fureman
*Assistant Examiner* — Michael Warmflash
(74) *Attorney, Agent, or Firm* — Lee & Morse, P.C.

(57) ABSTRACT

A battery system includes at least one battery unit, and a first battery management system that is operable to control the at least one battery unit. The first battery management system includes a first identification setup that is manually adjustable and is visible on an outside of the first battery management system, and the first battery management system is enabled to effect communication based on the first identification setup.

12 Claims, 5 Drawing Sheets

(56) References Cited

U.S. PATENT DOCUMENTS

| | | | |
|---|---|---|---|
| 2009/0066291 A1* | 3/2009 | Tien | H02J 7/0016 320/118 |
| 2009/0219660 A1* | 9/2009 | Shu | H02J 7/0026 361/90 |
| 2011/0161024 A1* | 6/2011 | Sim et al. | 702/63 |
| 2011/0175574 A1* | 7/2011 | Sim et al. | 320/121 |
| 2012/0228946 A1* | 9/2012 | Sim | H01M 2/024 307/80 |
| 2013/0026979 A1* | 1/2013 | Endo | B60L 11/1822 320/107 |
| 2013/0130068 A1* | 5/2013 | Song et al. | 429/50 |
| 2013/0169038 A1* | 7/2013 | King | B60L 3/0046 307/10.1 |
| 2013/0181513 A1* | 7/2013 | Yano | B60L 11/1816 307/10.1 |

FOREIGN PATENT DOCUMENTS

| | | |
|---|---|---|
| KR | 10-2005-0088263 A | 9/2005 |
| KR | 10-2011-0013747 | 2/2011 |
| KR | 10-2011-0107724 A | 10/2011 |

* cited by examiner

BATTERY SYSTEM HAVING IDENTIFIERS AND ENERGY STORAGE SYSTEM INCLUDING THE SAME

CROSS-REFERENCE TO RELATED APPLICATION

The present application claims priority under 35 U.S.C. §119(e) to U.S. Provisional Application No. 61/705,787, filed on Sep. 26, 2012, and entitled: "Battery System and Energy Storage System Including the Same," which is incorporated herein by reference in its entirety.

BACKGROUND

As the destruction of the environment and the depletion of resources are becoming severe, interest in a system capable of storing energy and effectively utilizing the stored energy is increasing. There has also been an interest in new renewable energy, which does not cause pollution or minimizes pollution during a power generation process. An energy storage system has recently undergone research in accordance with these environmental considerations and environmental changes. The energy system may be a system for connecting new renewable energy and a battery system for storing power.

SUMMARY

Embodiments may be realized by providing a battery system that includes at least one battery unit, and a first battery management system that is operable to control the at least one battery unit. The first battery management system includes a first identification setup that is manually adjustable and is visible on an outside of the first battery management system, and the first battery management system is enabled to effect communication based on the first identification setup.

The first identification setup may realize communication with a control unit on a same substrate. The first identification setup may be manually adjustable to set a communication identifier to effect communication via a network connected to the first battery management system.

The first identification setup may utilize multiple switches. The multiple switches may include a manually configurable dip switch unit or rotary switch unit. The manually configurable dip switch unit or rotary switch unit may be visible on the outside of the first battery management system. The manually configurable dip switch unit or rotary switch unit may be manually adjustable to set a communication identifier that represents a predetermined binary code to effect communication via a network connected to the first battery management system.

The first identification setup may be manually adjustable to represent a predetermined binary code that effects communication via a network connected to the first battery management system.

The battery system may include a second battery management system that communicates with the first battery management system. The second battery management system may communicate with the first battery management system via controller area network communication. The first identification setup may be configured for controller area network communication and may be manually adjustable without applying power via the battery system.

The second battery management system may include a second identification setup that is manually adjustable and visible on an outside of the second battery management system. The second identification setup may realize communication with a control unit on a same substrate.

The second identification setup may utilize multiple switches. The multiple switches may comprise a manually configurable dip switch unit or rotary switch unit. The manually configurable dip switch unit or rotary switch unit may be visible on the outside of the second battery management system. The first and second identification setups may be manually adjustable to represent different predetermined binary codes that effect communication via a network connected to the first and second battery management systems.

The second battery management system may be in communication with the first battery management system via controller area network communication. The first battery management system may be one of a plurality of first battery management systems that are tray management systems. The second battery management system may be a master battery management system that is connected via bus lines to each of the plurality of first battery management systems.

Embodiments may also be realized by providing an energy storage system having a battery system that includes at least one battery unit, and a first battery management system that is operable to control the at least one battery unit. The first battery management system includes a first identification setup that is manually adjustable and is visible on an outside of the first battery management system, and the first battery management system is enabled to effect communication based on the first identification setup.

Embodiments may also be realized by providing an energy storage system that is connected to a power generation system, a grid, and a load. The energy storage system includes a power conversion system, and a battery system that is connected to the power conversion system. The battery system includes at least one battery unit, and a first battery management system that is operable to control the at least one battery unit. The first battery management system includes a first identification setup that is manually adjustable and is visible on an outside of the first battery management system, and the first battery management system is enabled to effect communication based on the first identification setup.

Embodiments may also be realized by providing a method of establishing signal communication within a battery system that includes a battery system that includes at least one battery unit, and a first battery management system that is operable to control the at least one battery unit, the first battery management system includes a first identification setup that is manually adjustable and is visible on an outside of the first battery management system, and the first battery management system is enabled to effect communication based on the first identification setup. The method includes setting the first identification setup that is manually adjustable and visible from the outside of the first battery management system, turning a power of the battery system on after setting the first identification setup, and utilizing the first identification setup to effect communication after turning on the power of the battery system.

BRIEF DESCRIPTION OF THE DRAWINGS

Features will become apparent to those of ordinary skill in the art by describing in detail exemplary embodiments with reference to the attached drawings in which.

DETAILED DESCRIPTION

Figure 1:
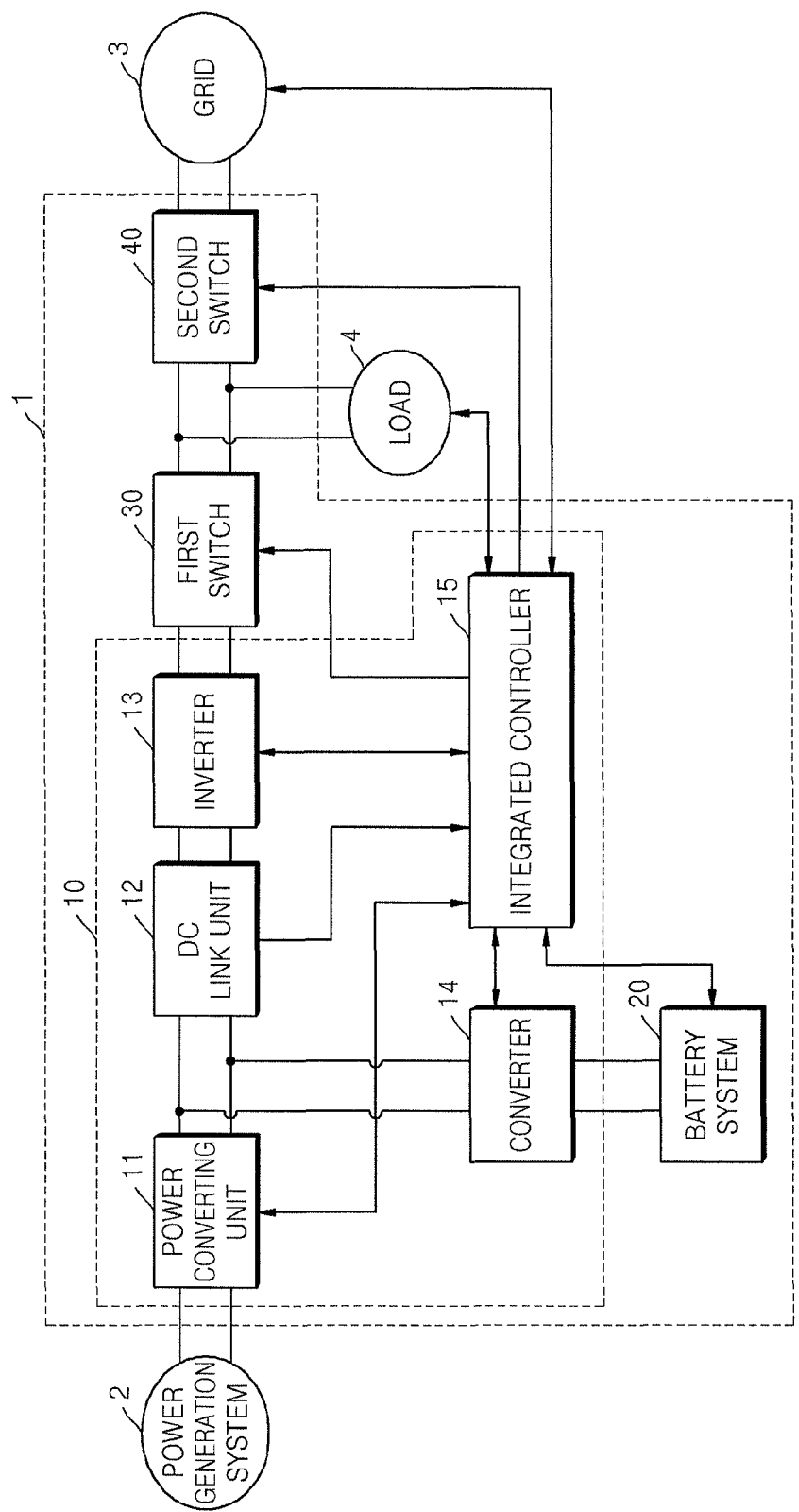
FIG. 1 illustrates a block diagram of an energy storage system, according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

As the inventive concept is not limited to the embodiments described in the present description, it should not be understood that the inventive concept includes every kind of variation examples or alternative equivalents included in the spirit and scope of the exemplary implementations. In the description, the detailed descriptions of well-known functions and structures may be omitted so as not to hinder the understanding of the exemplary embodiments. In the drawing figures, the dimensions of layers and regions may be exaggerated for clarity of illustration. Like reference numerals refer to like elements throughout.

The terminology used herein is for the purpose of describing particular embodiments only and is not intended to be limiting of example embodiments. As used herein, the singular forms "a," "an", and "the" are intended to include the plural forms as well, unless the context clearly indicates otherwise. It will be further understood that terms, such as includes, including, comprises, and/or comprising, when used in this specification, specify the presence of stated features, integers, steps, stages, operations, elements, and/or components, but do not preclude the presence or addition of one or more other features, integers, steps, stages, operations, elements, components, and/or groups thereof.

FIG. 1 illustrates a block diagram of an energy storage system 1, according to an exemplary embodiment.

Referring to FIG. 1, the energy storage system 1 may be connected to a power generation system 2 and a grid 3 to supply power to a load 4. For example, the energy storage system 1 may be connected between the power generation system 2 and the grid 3

The power generation system 2 is a system for generating power by using an energy source. The power generation system 2 may supply the generated power to the energy storage system 1. The power generation system 2 may be, e.g., a solar power generation system, a wind power generation system, a tidal power generation system, or the like. However, embodiments are not limited thereto, e.g., the power generation system 2 may be any of power generation systems generating power by using new renewable energy such as solar heat or geothermal heat. For example, a solar cell generating electric energy by using solar light may be easily installed in a house or a factory and thus may be efficiently used in the energy storage system 1 that is installed in a house or a factory. The power generation system 2 may be configured as a large capacity energy system, e.g., by having a structure that includes a plurality of power generation modules arranged in parallel in which power is generated using each of the power generation modules.

The grid 3 may include at least one of a power generating station, an electric power substation, a power line, and the like. When the grid 3 is in a normal state, the grid 3 may supply power to the energy storage system 1 to allow the power to be supplied to the load 4 and/or a battery system 20, and/or the grid 3 may receive power from the energy storage system 1. When the grid 3 is in an abnormal state, power supply from the grid 3 to the energy storage system 1 may be stopped, and power supply from the energy storage system 1 to the grid 3 may also be stopped.

The load 4 consumes power generated by the power generation system 2, power stored in the battery system 20 of the energy storage system 1, or power supplied from the grid 3. For example, the load 4 may be a house, a factory, or the like.

The energy storage system 1 may store power generated by the power generation system 2 within the battery system 20 and supply the generated power to the grid 3. The energy storage system 1 may supply power stored in the battery system 20 to the grid 3 or store power supplied from the grid 3 in the battery system 20. When the grid 3 is in an abnormal state, e.g., when a power failure occurs in the grid, the energy storage system 1 may perform an uninterruptible power supply (UPS) operation to supply power to the load 4. When the grid 3 is in a normal state, the energy storage system 1 may supply the power generated by the power generation system 2 and the power stored in the battery system 20 to the load 4. For example, when the grid 3 is in a normal state, the energy storage system 1 may supply power to supplement the power supplied by the grid 3.

Referring to FIG. 1, the energy storage system 1 may include a power conversion system (PCS) 10, the battery system 20, a first switch 30, a second switch 40, and the like.

The PCS 10 may convert power supplied from the power generation system 2, the grid 3, and the battery system 20 into power appropriate for a destination and supply the appropriate power to the destination. The PCS 10 may include a power converting unit 11, a direct current (DC) link unit 12, an inverter 13, a converter 14, and an integrated controller 15.

The power converting unit 11 is a device for converting power that may be arranged between the power generation system 2 and the DC link unit 12. The power converting unit 11 may send power generated by the power generation system 2 to the DC link unit 12. For example, the power converting unit 11 may convert a voltage output by the power generation system 2 into a DC link voltage.

The power converting unit 11 may be configured as a power conversion circuit such as a converter or a rectifier circuit according to the type of the power generation system 2. When power generated by the power generation system 2 is DC power, the power converting unit 11 may be a converter for converting the DC power into DC power having a different level such as a different voltage level. According to another exemplary embodiment, when the power generated by the power generation system 2 is AC power, the power converting unit 11 may be a rectifier circuit for converting the AC power into DC power.

For example, when the power generation system 2 is a solar power generation system, the power converting unit 11 may include a maximum power point tracking (MPPT) converter for performing MPPT controlling so as to maximize power generated by the power generation system 2 according to at least one variation such as solar insolation and/or a temperature. When the power generation system 2 does not generate any power, the power converting unit 11 may stop operating to minimize power consumed by a converter or the like.

A magnitude of the DC link voltage may be unstable due to factors, e.g., a sudden drop in voltage output by the power generation system 2 or the grid 3, generation of a peak load in the load 4, or the like. However, the DC link voltage may need to be stable for normal operations of the converter 14 and the inverter 13. The DC link unit 12 is connected between the power converting unit 11 and the inverter 13 so as to maintain constant the DC link voltage. The DC link unit 12 may be, for example, a large capacity capacitor.

The inverter 13 is a power conversion device that may be connected between the DC link unit 12 and the first switch 30. The inverter 13 may include an inverter for converting the DC link voltage output from the power generation system 2 and/or the battery system 20 in a discharging mode into an AC voltage of the grid 3 and outputting the AC voltage. The inverter 13 may include a rectifier circuit for rectifying the AC voltage of the grid 3, converting the AC voltage into the DC link voltage, and outputting the DC link voltage in order to store power of the grid 3 in the battery system 20 during a charging mode. According to another exemplary embodiment, the inverter 13 may be a bidirectional inverter in which directions of input and output may be changed.

The inverter 13 may include a filter for removing a harmonic wave from an AC voltage output to the grid 3. The inverter 13 may also include a phase locked loop (PLL) circuit for synchronizing a phase of the AC voltage output from the inverter 13 and a phase of an AC voltage of the grid 3 in order to reduce the possibility of and/or prevent a reactive power from being generated. The inverter 13 may perform functions such as restriction of a voltage fluctuation range, improvement of a power-factor, elimination of a DC component, protection from transient phenomena, and the like. When the inverter 13 is not used, the inverter 13 may be stopped so that operation is paused in order to minimize power consumption.

The converter 14 is a power conversion device that may be connected between the DC link unit 12 and the battery system 20. The converter 14 may include a converter for DC-DC converting power stored in the battery system 20 into a voltage level required in the inverter 13, that is, into the DC link voltage. The converter 14 may output the DC link voltage in a discharging mode. The converter 14 may include a converter for DC-DC converting a voltage of power output from the power converting unit 11 or power output from the inverter 13 into a voltage level compatible with the battery system 20, that is, into a charging voltage, in a charging mode. According to another exemplary embodiment, the converter 14 may be a bidirectional converter in which directions of input and output may be changed. When the battery system 20 does not need to be charged or discharged, the converter 14 may be stopped so that operation is paused in order to minimize power consumption.

The integrated controller 15 may monitor states of the power generation system 2, the grid 3, the battery system 20, and the load 4. The integrated controller 15 may control operations of the power converting unit 11, the inverter 13, the converter 14, the battery system 20, the first switch 30, and the second switch 40 according to a result of the monitoring and a predetermined algorithm. For example, the integrated controller 15 may monitor whether there is a power failure in the grid 3, whether power is generated by the power generation system 2, an amount of power generated by the power generation system 2 when power is generated by the power generation system 2, a charging state of the battery system 20, an amount of power consumed by the load 4, a time, and the like. Also, For example, when power to be supplied to the load 4 is not sufficient such as when a power failure occurs in the grid 3, the integrated controller 15 may determine priorities with respect to power consumption devices included in the load 4 and control the supply of power to the power consumption devices having higher priority.

The first switch 30 and the second switch 40 may be connected to each other in series between the inverter 13 and the grid 3. The first switch 30 and the second switch 40 may control current flow between the power generation system 2 and the grid 3 by performing an on/off operation under the control of the integrated controller 15. The on/off operation of the first switch 30 and the second switch 40 may be determined according to states of the power generation system 2, the grid 3, and/or the battery system 20.

For example, when power of the power generation system 2 and/or the battery system 20 is supplied to the load 4 or when power of the grid 3 is supplied to the battery system 20, the first switch 30 may be set to an on state. When power of the power generation system 2 and/or the battery system 20 is supplied to the grid 3 or when power of the grid 3 is supplied to the load 4 and/or the battery system 20, the second switch 40 may be set to an on state.

When there is a power failure in the grid 3, the second switch 40 may be set to an off state and the first switch 30 may be set to an on state. That is, power may be supplied from the power generation system 2 and/or the battery system 20 to the load 4, and at the same time, power supplied to the load 4 may be prevented from flowing to the grid 3. Thus, the possibility of accidents such as a worker being shocked by a power line of the grid 3 may be reduced and/or prevented from occurring by stopping the transmitting of power from the energy storage system 1 to the grid 3.

The first switch 30 and the second switch 40 may each be a switching device such as a relay that is capable of withstanding a large capacity current.

The battery system 20 may be configured to receive power of the power generation system 2 and/or the grid 3 and store the power therein. The battery system 20 may also be configured to supply the power stored therein to the load 4 and/or the grid 3. The battery system 20 may include a part for storing power, and a part for controlling and protecting the part for storing power. The battery system 20 may include therein at least one battery management system (BMS).

For example, the battery system 20 may include a plurality of BMSs that are in arranged in a hierarchy type communication order, e.g., to enable communication through controller area network (CAN) communication. For example, the plurality of BMSs may be arranged so that messages may be sent between ones of the plurality of BMSs, and the message may consist of an identifier that is assists in effecting communication between the ones of the plurality of BMSs.

Hereinafter, the battery system 20 will be described in detail with reference to FIG. 2.

Figure 2:
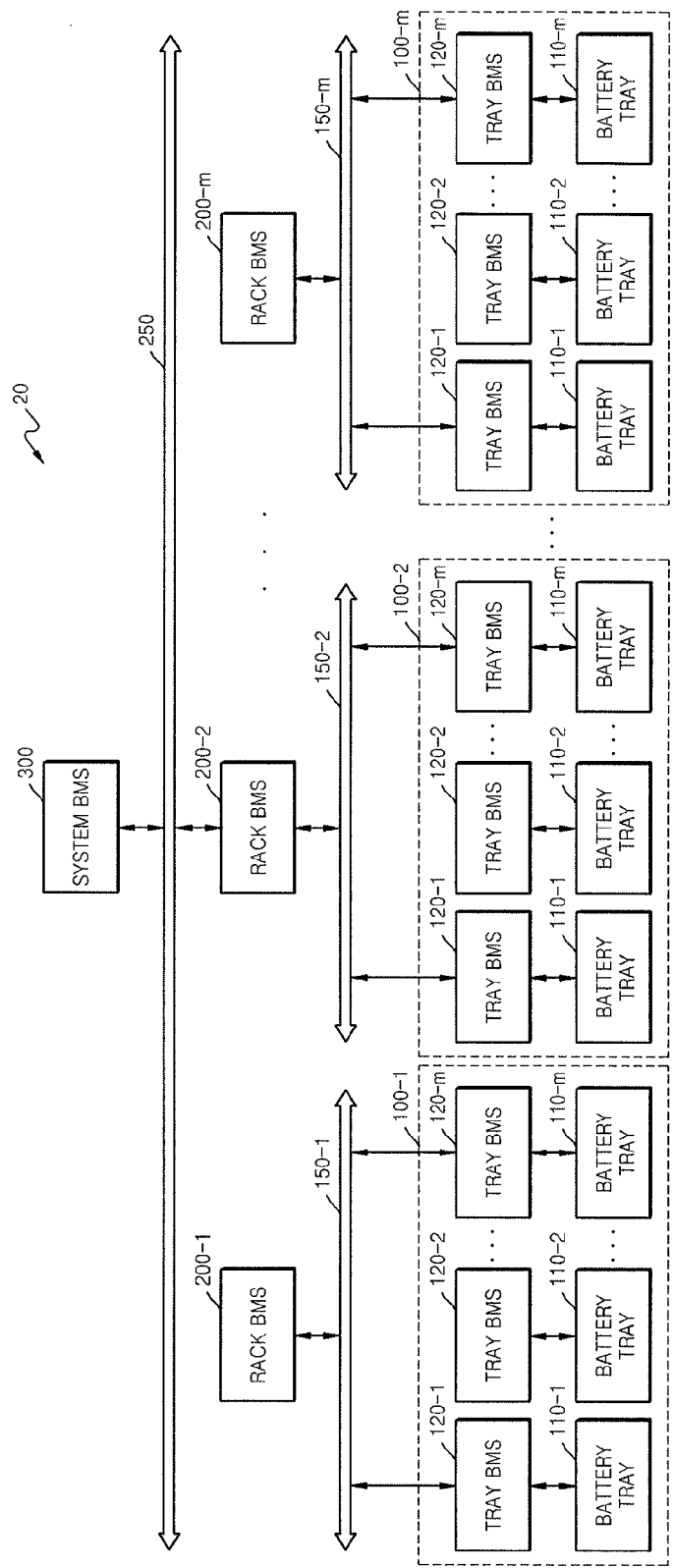
FIG. 2 illustrates a block diagram of a battery system, according to an exemplary embodiment.

Referring to FIG. 2, the battery system 20 may include at least one battery rack from battery racks 100-1 through 100-m, and may include at least one rack BMS from rack BMSs 200-1 through 200-m. Each of the rack BMSs 200-1 through 200-m may control one of the battery racks 100-1 through 100-m, respectively. Each of the battery racks 100-1 through 100-m may include therein at least one tray BMS of the tray BMSs 120-1 through 120-m. Each of the tray BMSs 120-1 through 120-m may control at least one battery unit arranged within the corresponding one of the battery racks 100-1 through 100-m. A corresponding one of the rack BMSs 200-1 through 200-m, may communicate with and/or control ones of the tray BMSs 120-1 through 120-m. A system BMS 300 may control the rack BMSs 200-1 through 200-m.

For example, each of the battery racks 100-1 through 100-m may include a plurality of the battery trays 110-1 through 110-m and a plurality of the tray BMSs 120-1 through 120-m for respectively controlling the plurality of battery trays 110-1 through 110-m. For example, one of the battery trays 110-1 through 110-m may be connected to one of the plurality of tray BMSs 120-1 through 120-m, so as to be electrically isolated from the others of the plurality of tray BMSs 120-1 through 120-m. One of the rack BMSs 200-1 through 200-m may be connected to each of the tray BMSs 120-1 through 120-m within one of the battery racks 100-1 through 100-m, so as to be isolated from others of the battery racks 100-1 through 100-m. Further, the system BMS 300 may be connected to each of the rack BMSs 200-1 through 200-m to control all of the battery racks 100-1 through 100-m.

Each of the battery trays 110-1 through 110-m may include at least one battery cell. A battery cell may be, e.g., a nickel-cadmium battery (NiCd), a lead storage battery, a nickel metal hydride (NiMH) battery, a lithium ion battery, a lithium polymer battery, etc. Battery cells included in each of the battery trays 110-1 through 110-$m$ may be connected to each other in series, in parallel, or in combination of serial and parallel connections. At least two from among the battery trays 110-1 through 110-$m$ may be connected to each other in series. However, embodiments are not limited thereto, e.g., at least two from among the battery trays 110-1 through 110-m may be connected to each other in parallel or in combination of serial and parallel connections.

The tray BMSs 120-1 through 120-m may monitor voltages, currents, temperatures, and remaining capacities of battery cells included in the battery trays 110-1 through 110-m and control charging and discharging of the battery trays 110-1 through 110-m based on a monitored result. The tray BMSs 120-1 through 120-m may perform functions including over-charging protection, over-discharging protection, over-current protection, over-voltage protection, over-heat protection, and/or cell balancing to protect the battery trays 110-1 through 110-m according to a monitored result. The tray BMSs 120-1 through 120-m may transmit a monitored result to a corresponding one of the rack BMSs 200-1 through 200-m and may control the corresponding ones of the battery trays 110-1 through 110-m according to control signals received from the rack BMSs 200-1 through 200-m.

The tray BMSs 120-1 through 120-m may function as slave BMSs, and the rack BMSs 200-1 through 200-m may function as master BMSs. The rack BMSs 200-1 through 200-m as master BMSs may collect data via ones of the tray BMSs 120-1 through 120-m as slave BMSs for checking status of battery cells and/or controlling charging/discharging the battery cells. The rack BMSs 200-1 through 200-m may perform data communication with the tray BMSs 120-1 through 120-m via a corresponding one of first bus lines 150-1 through 150-m.

To enable communication, respective communication IDs for the rack BMSs 200-1 through 200-m as master BMSs may be setup to perform data communication, e.g., CAN communication, with the tray BMSs 120-1 through 120-m as slave BMSs via the first bus lines 150-1 through 150-m. Detailed description thereof will be given below with reference to FIGS. 3 through 5.

The rack BMSs 200-1 through 200-m monitor voltages, currents, temperatures, and/or remaining capacities of battery racks 100-1 through 100-m and/or control charging and discharging of the battery racks 100-1 through 100-m based on a monitored result. Furthermore, the rack BMSs 200-1 through 200-m may perform functions including over-charging protection, over-discharging protection, over-current protection, over-voltage protection, over-heat protection, and/or cell balancing to protect the battery racks 100-1 through 100-m according to a monitored result. The rack BMSs 200-1 through 200-m may transmit a monitored result to the system BMS 300, and may control the battery trays 100-1 through 100-m according to control signals received from the system BMS 300.

Further, the rack BMSs 200-1 through 200-m may function as a slave BMS, and the system BMS 300 may function as master BMS. The system BMS 300 as a master BMS may collect data via the rack BMSs 200-1 through 200-m as slave BMSs, e.g., for checking status of battery cells and/or controlling charging/discharging the battery racks 100-1 through 100-m. The system BMS 300 may perform data communication with each of the rack BMSs 200-1 through 200-m via a second bus line 250.

Respective communication IDs for the system BMS 300 as master BMS may be setup to perform data communication, e.g., CAN communication, with the rack BMSs 200-1 through 200-m as slave BMSs via the second bus line 250. Detailed description thereof will be given below with reference to FIGS. 3 through 5.

According to an exemplary embodiment, at least two battery racks 100-1 through 100-m may be connected to each other in parallel. However, it is merely an example, and the at least two battery racks 100-1 through 100-m may also be connected to each other in series or in combination of serial and parallel connections. The at least two battery racks 100-1 through 100-m may output power to be supplied to the load 4 or the grid 3 under the control of the rack BMSs 200-1 through 200-m. Further, the at least two battery racks 100-1 through 100-m may output power for operation of the system BMS 300 in a case where no external power is supplied to the system BMS 300 as operational power.

Figure 3:
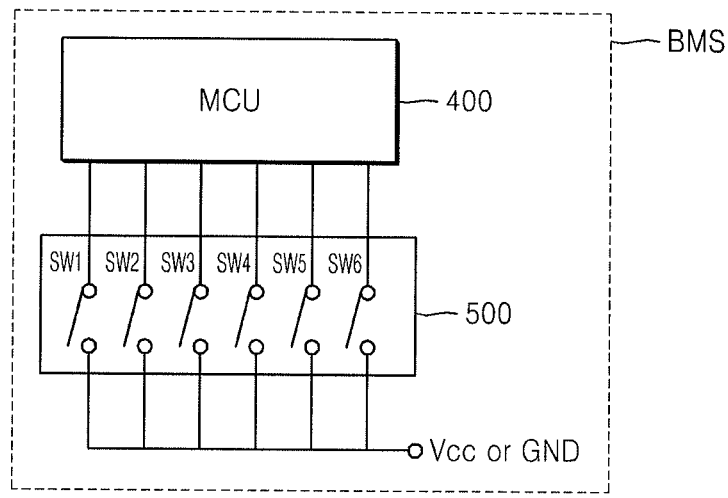
FIG. 3 illustrates a diagram showing the internal configuration of a battery management system for setting up an ID, according to an exemplary embodiment.
Figure 4:
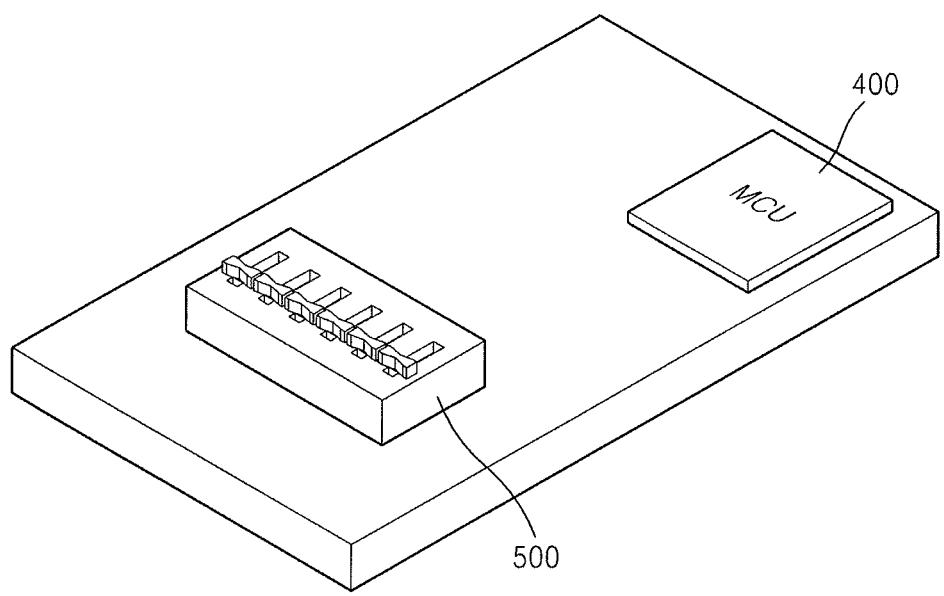
FIG. 4 illustrates a perspective view of the battery management system shown in FIG. 3.
Figure 5A:
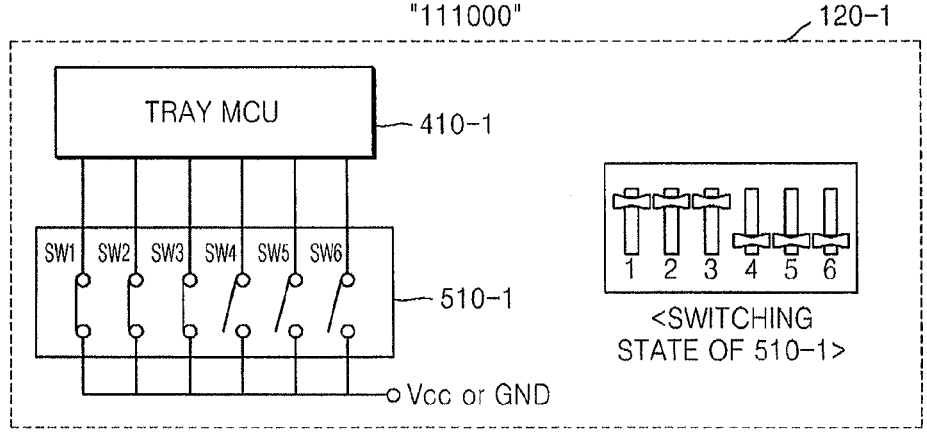
FIGS. 5A, 5B, and 5C illustrate diagrams for describing setting up communication IDs for the battery system of FIG. 2.
Figure 5B:
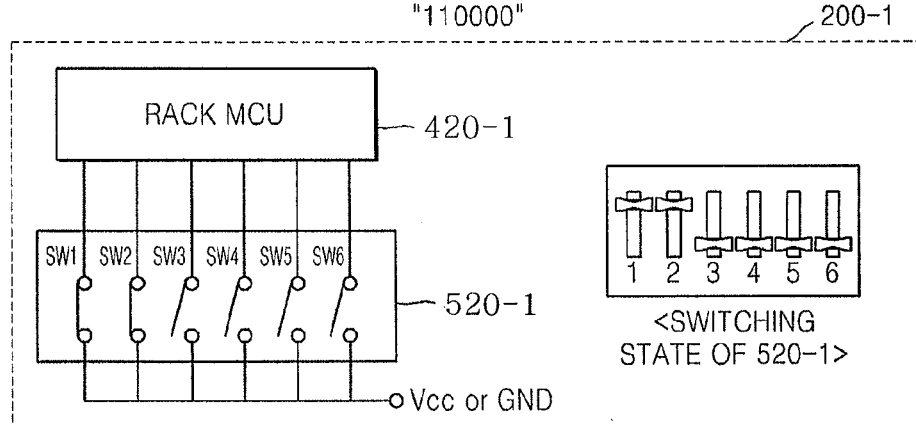
Figure 5C:
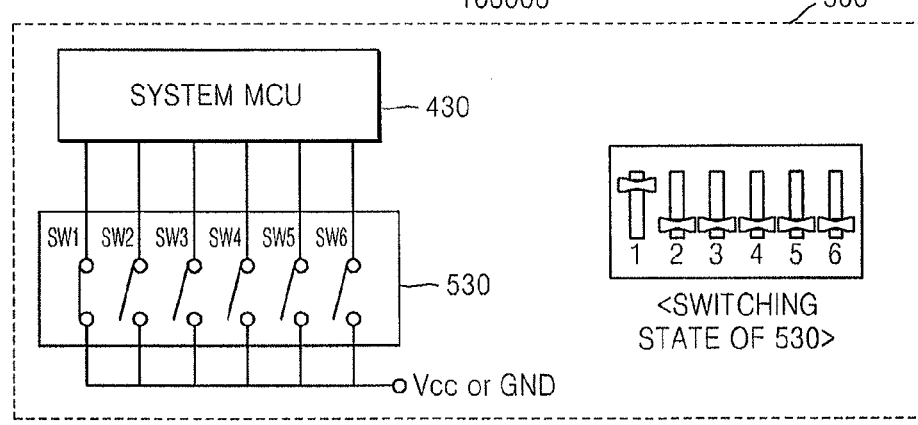

FIG. 3 illustrates a diagram showing the internal configuration of an exemplary BMS for setting up an ID for communication. FIG. 4 illustrates a perspective view of the BMS shown in FIG. 3. FIGS. 5A, 5B, and 5C illustrate diagrams for describing setting up communication IDs for ones of the BMSs in the battery system 20 of FIG. 2.

Referring to FIG. 3, a BMS is illustrated, which BMS may be anyone of, e.g., the system BMS, the rack BMSs 200-1 through 200-m, and the tray BMSs 120-1 through 120-m. The BMS may include an MCU 400 and an ID setup unit 500. Referring to FIG. 4, the MCU 400 and the ID setup unit 500 may be arranged on a same substrate. The ID setup unit 500 may be arranged so as to be visible from an outside of the BMS so that the ID setup unit 500 may be manually adjusted by a user to set an identification setup to enable the BMS to effect communication. For example, the identification setup may be manually set via the ID setup unit 500, which is visible from an outside of the battery system 20, so that the BMS may effect communication with components within the battery system 20. The ID setup unit 500 may be manually adjusted so that power is not applied through the battery system 20 for setting a communication ID. For example, the ID setup unit 500 may be used in order to realize unique communication IDs for each of the plurality of BMSs in the battery system 20 without utilizing an electrical connection with the battery system 20.

Referring to FIG. 5A, the tray BMSs 120-1 through 120-m may include tray MCUs 410-1 through 410-m and tray ID setup units 510-1 through 510-m, respectively. The tray ID setup units 510-1 through 510-m may each be manually adjustable and may be visible from an outside of the tray BMSs 120-1 through 120-m, respectively. Each of the tray ID setup units 510-1 through 510-m may be manually adjusted to represent a unique communication ID for each of the tray BMSs 120-1 through 120-m to effect communication within the battery system 20.

Referring to FIG. 5B, the rack BMSs 200-1 through 200-m may include rack MCUs 420-1 through 420-m and rack ID setup units 520-1 through 520-m, respectively. The rack ID setup units 520-1 through 520-m may each be manually adjustable and may be visible from an outside of the rack BMSs 200-1 through 200-m, respectively. Each of the rack ID setup units 520-1 through 520-m may be manually adjusted to represent a unique communication ID for each of the rack BMSs 200-1 through 200-m to effect communication within the battery system 20. The unique communication IDs for the rack BMSs 200-1 through 200-m may constitute different binary codes than binary codes that constitute the unique communication IDs for the tray BMSs 120-1 through 120-m.

Referring to FIG. 5C, the system BMS 300 may include a system MCU 430 and a system ID setup unit 530. The system ID setup unit 530 may be manually adjustable and may be visible from an outside of the system BMS 300. The system ID setup unit 530 may be manually adjusted to represent a unique communication ID for the system BMS 300 to effect communication within the battery system 20. The unique communication ID for the system BMS 300 may constitute a different binary code than the binary codes for the rack BMSs 200-1 through 200-m and the binary codes for the tray BMSs 120-1 through 120-m.

Setting up communication IDs for the tray BMSs 120-1 through 120-m will be discussed below. For convenience of explanation, setting up a communication ID for the tray BMS 120-1, which is in communication with the battery rack 100-1, will be described. Communication IDs regarding the other tray BMSs 120-1 through 120-m of the other battery racks 100-2 through 100-m, respectively, may be set in the same regard.

The tray MCU 410-1 may monitor voltages, currents, temperatures, and/or remaining capacities of battery cells. The tray MCU 410-1 may control charging and discharging of the battery tray 110-1 based on a monitored result.

The tray ID setup unit 510-1 may be connected to the tray MCU 410-1. The tray ID setup unit 510-1 and the tray MCU 410-1 may be arranged on a same substrate as shown in FIG. 4. According to an exemplary embodiment, the tray ID setup unit 510-1 may include multiple switches. The multiple switches may constitute a dip switch unit, e.g., that is manually adjustable and that is visible from an outside of the tray BMS 120-1. However, embodiments are not limited thereto, e.g., the tray ID setup unit 510-1 may include a rotary switch unit. A user may adjust the dip switch unit or the rotary switch unit by hand, e.g., the user may switch the dip switch unit on and off by hand. Accordingly, the dip switch unit and the rotary switch unit may be manually adjustable without applying power to the tray BMS 120-1, e.g., without applying power via the battery system 20.

Referring to FIG. 5A, according to an exemplary embodiment, the tray ID setup unit 510-1 may include switches SW1, SW2, SW3, SW4, SW5, and SW6. A first end of each of the switches SW1 through SW6 may be connected to VCC or GND, and a second end of each of the switches SW1 through SW6 may be connected to the tray MCU 410-1. Although there are 6 switches shown in FIGS. 3, 4, and 5A, embodiments are not limited thereto, and a number of switches may be increased or decreased.

The tray ID setup unit 510-1 is configured to enable a communication ID to be set based on operations by hand with respect to the switches SW1 through SW6, e.g., by manually adjusting the switches SW1 through SW6. For example, according to on/off states of the switches SW1 through SW6 based on a manual operation by a user, the tray MCU 410-1 may receive a binary code and may set the binary code as a communication ID for identifying the tray BMS 120-1 to effect communication.

FIG. 5A shows an example of setting a communication ID of the tray BMS 120-1. Referring to FIG. 5A, from among the six switches SW1 through SW6 of the tray ID setup unit 510-1, first through third switches SW1, SW2, and SW3 are switched on by a user's hand operation, and the other switches SW4, SW5, and SW6 are switched off. In this case, the tray MCU 410-1 receives a binary code "111000" from the tray ID setup unit 510-1 and sets the binary code "111000" as the communication ID of the tray BMS 120-1.

Setting up communication IDs for the rack BMSs 200-1 through 200-m will be described below. For convenience of explanation, setting up a communication ID for the rack BMS 200-1, which is in communication with the battery rack 100-1, will be described below. Communication IDs regarding the other rack BMSs 200-2 through 200-m of the other battery racks 100-2 through 100-m, respectively, may be set in the same regard.

The rack MCU 420-1 may monitor voltages, currents, temperatures, and/or remaining capacities of battery cells in the battery rack 100-1. The rack MCU 420-1 may control charging and discharging of the battery rack 100-1 based on a monitored result.

The rack ID setup unit 520-1 may be connected to the rack MCU 420-1. The rack ID setup unit 520-1 and the rack MCU 420-1 may be arranged on a same substrate as shown in FIG. 4. According to an exemplary embodiment, the rack ID setup unit 520-1 may include multiple switches. The multiple switches may constitute a dip switch unit, e.g., that is manually adjustable and that is visible from an outside of the rack BMS 200-1. However, embodiments are not limited thereto, e.g., the rack ID setup unit 520-1 may include a rotary switch unit. A user may adjust the dip switch unit or the rotary switch unit by hand, e.g., the user may switch the dip switch unit on and off by hand. Accordingly, the dip switch unit and the rotary switch unit may be manually adjustable without applying power to the rack BMS 200-1, e.g., without applying power via the battery system 20.

Referring to FIG. 5B, according to an exemplary embodiment, the rack ID setup unit 520-1 may include switches SW1, SW2, SW3, SW4, SW5, and SW6. A first end of each of the switches SW1 through SW6 may be connected to VCC or GND, and a second end of each of the switches SW1 through SW6 may be connected to the rack MCU 420-1. Although there are 6 switches shown in FIGS. 3, 4, and 5B, embodiments are not limited thereto, and a number of switches may be increased or decreased.

The rack ID setup unit 520-1 may be used to setup a communication ID based on operations by hand with respect to the switches SW1 through SW6. For example, according to on/off states of the switches SW1 through SW6 based on a manual operation by a user, the rack MCU 420-1 may receive a binary code and may set the binary code as a communication ID for identifying the rack BMS 200-1 to effect communication.

FIG. 5B shows an example of setting a communication ID of the rack BMS 200-1. Referring to FIG. 5B, from among the six switches SW1 through SW6 of the rack ID setup unit 520-1, first and second switches SW1 and SW2 are switched on by a user's hand operation, and the other switches SW3, SW4, SW5, and SW6 are switched off. In this case, the rack MCU 420-1 receives a binary code "110000" from the rack ID setup unit 520-1 and sets the binary code "110000" as the communication ID of the rack BMS 200-1.

Setting up a communication ID for the system BMS 300 will be described below. The system BMS 300 may receive results monitored by the rack BMSs 200-1 through 200-m. The system BMS 300 may control the battery racks 100-1 through 100-m based on the results.

The system ID setup unit 530 may be connected to the system MCU 430. The system ID setup unit 530 and the system MCU 430 may be arranged on a same substrate as shown in FIG. 4. According to an exemplary embodiment, the system ID setup unit 530 may include multiple switches. The multiple switches may constitute a dip switch unit, e.g., that is manually adjustable and that is visible from an outside of the system BMS 300. However, embodiments are not limited thereto, e.g., the system ID setup unit 530 may include a rotary switch unit. A user may adjust the dip switch unit or the rotary switch unit by hand, e.g., the user may switch the dip switch unit on and off by hand. Accordingly, the dip switch unit and the rotary switch unit may be manually adjustable without applying power to the system BMS 300, e.g., without applying power via the battery system 20.

Referring to FIG. 5C, according to an exemplary embodiment, the system ID setup unit 530 may include switches SW1, SW2, SW3, SW4, SW5, and SW6. A first end of each of the switches SW1 through SW6 may be connected to VCC or GND, and a second end of each of the switches SW1 through SW6 may be connected to the system MCU 430. Although there are 6 switches shown in FIGS. 3, 4, and 5C, embodiments are not limited thereto, and a number of switches may be increased or decreased.

The system ID setup unit 530 may be used to setup a communication ID based on operations by hand with respect to the switches SW1 through SW6. For example, according to on/off states of the switches SW1 through SW6 based on a manual operation by a user, the system MCU 430 may receive a binary code and may set the binary code as a communication ID of the system BMS 300.

FIG. 5C shows an example of setting a communication ID of the system BMS 300. Referring to FIG. 5C, from among the six switches SW1 through SW6 of the system ID setup unit 530, a first switch SW1 is switched on by a user's hand operation, and the other switches SW2, SW3, SW4, SW5, and SW6 are switched off. In this case, the system MCU 430 receives a binary code "100000" from the system ID setup unit 530 and sets the binary code "100000" as the communication ID of the system BMS 300.

As described above, by manually setting a communication ID for the BMS by using the ID setup unit 500, which ID setup unit 500 is arranged on a same substrate with the MCU 400 and is connected to the MCU 400 via a first end, the communication ID may be figured out without applying power and without connecting connectors to the BMS and the like. Accordingly, manufacturing/inspecting efficiencies may be improved.

Figure 6:
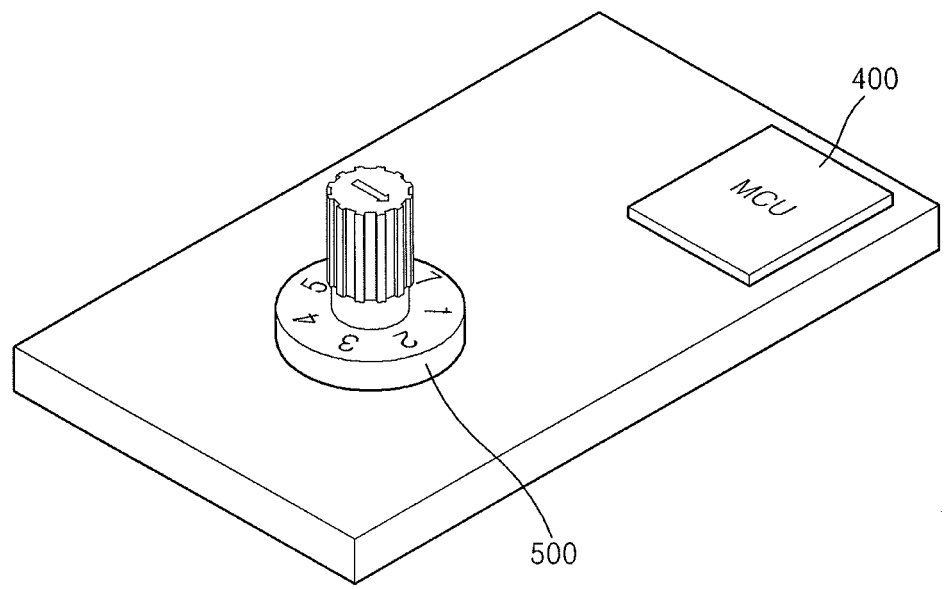
FIG. 6 illustrates a perspective view of a battery management, according to an exemplary embodiment.

FIG. 6 illustrates a perspective view of a modification of the BMS shown in FIG. 3.

Although a dip switch is used as the ID setup unit 500 in FIG. 3, embodiments are not limited thereto. Referring to FIG. 6, the ID setup unit 500 may be embodied with a rotary switch unit. The rotary switch unit may include a rotating switch for selecting one from among a plurality of input signals, which input signals may correspond to one unique communication ID. For example, a contact of a rotary switch unit may be selected by a user's hand operation to set a communication ID for a corresponding BMS. The rotary switch unit may be manually adjustable and may be visible from an outside of the BMS.

The ID setup unit 500 is not limited to a dip switch unit or a rotary switch unit. The ID setup unit 500 may be embodied with any of various switches or units that may be switched on and off or adjusted to represent different codes via a manual operation performed by a user. Accordingly, a plurality of unique communication IDs may be set without applying power through the battery system 20 in order to effect communication within the battery system 20.

By way of summation and review, according to an exemplary embodiment, an energy storage system may be a system for connecting new renewable energy, a battery system for storing power, and an existing grid. In such an energy storage system, a battery system may be designed in various ways according to an amount of power to be supplied to a load, that is, a load amount. The battery system may receive power from the outside, store the power, and supply the stored power to the outside. For example, the battery system may perform charging and discharging operations.

As a demand for a large capacity structure increases, e.g., for utilization in an energy storage source, a battery system having a multi-module structure in which a plurality of battery packs are connected in series or in parallel may be used. Such a battery system having a multi-module structure may be configured in various forms according to, e.g., circuit logics or PCB configurations.

For improved monitoring and controlling efficiency, a structure including a plurality of battery management systems (BMS), e.g., for managing sensing cell voltages of a plurality of battery cells and controlling battery cell balancing, may be used in a structure that includes slave BMSs in communication with a master BMS. The structure may be configured for integrated control over the plurality of BMSs. For example, in the structure, the master BMS may communicate with the slave BMSs and collect data regarding a plurality of batteries controlled by the slave BMSs, e.g., for checking current battery status and controlling charging/discharging.

The master BMS and the slave BMSs may set respective communication identifiers used for communication. The communication identifiers may be stored by a process that uses an electronically erasable/programmable read-only memory (EEPROM) or an equivalent memory device. However, the process includes applying power to the plurality of BMSs, connecting a connector to the plurality of BMSs, and executing a designated Window program to confirm and modify communication identifiers for each of the plurality of BMSs. Therefore, it is inconvenient and time consuming to confirm and modify communication identifiers according to such a process.

In contrast, one or more embodiments relate to a battery system that enables a simplified setup for an establishing an identifier for each of a plurality of BMSs so that data communication may be realized, and an energy storage system including the battery system. Further, one or more embodiments relate to a battery system that includes a switch connected to a BMS for intuitively confirming and modifying an identifier for the BMS by operating the switch, and an energy storage system including the battery system.

The particular implementations shown and described herein are illustrative examples of the invention and are not intended to otherwise limit the scope of the invention in any way. For the sake of brevity, conventional electronics, control systems, software development, and other functional aspects of the systems may not be described in detail. Further, the connecting lines, or connectors shown in the various figures presented are intended to represent exemplary functional relationships and/or physical or logical couplings between the various elements. It should be noted that many alternative or additional functional relationships, physical connections, or logical connections may be present in a practical device. Also, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Further, recitation of ranges of values herein are merely intended to serve as a shorthand method of referring individually to each separate value falling within the range, unless otherwise indicated herein, and each separate value is incorporated into the specification as if it were individually recited herein.

The stages of all methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the invention unless otherwise claimed. Numerous modifications and adaptations will be readily apparent to those skilled in this art without departing from the spirit and scope of the present invention.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery system, comprising:
    at least one battery unit; and
    a first battery management system to control the at least one battery unit; and
    a second battery management system to communicate with and control the first battery management system, wherein:
    the first battery management system includes a first identification setup circuit that is manually adjustable to set a first identifier and is visible from outside of the first battery management system, the first battery management system to effect communication based on the first identifier, wherein the first identification setup circuit includes multiple manual switches to set a multiple-digit code corresponding to the first identifier, and
    the second battery management system includes a second identification setup circuit that is manually adjustable, the second identification setup circuit including at least one manually configurable dip switch or rotary switch visible from outside of the second battery management system, wherein the second battery management system is not directly connected to the at least one battery unit or any other battery unit.

2. The battery system as claimed in claim 1, further comprising a control unit on a same substrate as the first identification setup circuit, the first identification setup circuit to communicate with the control unit.

3. The battery system as claimed in claim 1, wherein the first identification setup circuit is manually adjustable to set the first identifier, the first identifier corresponding to a communication identifier to effect communication via a network connected to the first battery management system.

4. The battery system as claimed in claim 1, wherein the multiple manual switches include at least one a manually configurable dip switch or rotary switch.

5. The battery system as claimed in claim 4, wherein the at least one manually configurable dip switch or rotary switch is visible from outside of the first battery management system.

6. The battery system as claimed in claim 5, wherein the multiple-digit code corresponds to a predetermined binary code to effect communication via a network connected to the first battery management system.

7. The battery system as claimed in claim 1, wherein:
    the second battery management system is to communicate with the first battery management system via a controller area network, and
    the first identification setup circuit is configured for controller area network communication and is manually adjustable without applying power via the battery system.

8. The battery system as claimed in claim 1, further comprising a control unit on a same substrate as the second identification setup circuit, the second identification setup circuit to communicate with the control unit.

9. The battery system as claimed in claim 1, wherein the first and second identification setup circuits are manually adjustable to represent different binary codes that effect communication via a network connected to the first and second battery management systems.

10. The battery system as claimed in claim 1, wherein:
    the second battery management system is to communicate with the first battery management system via a controller area network, and
    the first battery management system is one of a plurality of first battery management systems that are tray management systems, the second battery management system being a master battery management system that is connected via bus lines to the first battery management systems.

11. An energy storage system having the battery system as claimed in claim 1.

12. An energy storage system that is connected to a power generation system, a grid, and a load, the energy storage system comprising:
    a power conversion system; and the battery system as claimed in claim 1, which is connected to the power conversion system.

* * * * *